United States Patent
Nakev

(10) Patent No.: US 11,760,459 B2
(45) Date of Patent: Sep. 19, 2023

(54) DRIVING UNIT FOR A TUNNEL THRUSTER AND A TUNNEL THRUSTER WITH SUCH DRIVING UNIT

(71) Applicant: Plamen Iordanov Nakev, Sofia (BG)

(72) Inventor: Plamen Iordanov Nakev, Sofia (BG)

( * ) Notice: Subject to any disclaimer, the term of this patent is extended or adjusted under 35 U.S.C. 154(b) by 257 days.

(21) Appl. No.: 17/485,018

(22) Filed: Sep. 24, 2021

(65) Prior Publication Data

US 2022/0097816 A1 Mar. 31, 2022

(30) Foreign Application Priority Data

Sep. 28, 2020 (EP) .................................... 20472012

(51) Int. Cl.
| | | |
|---|---|---|
| *B63H 21/17* | (2006.01) | |
| *B63H 1/16* | (2006.01) | |
| *B63H 21/38* | (2006.01) | |
| *B63H 25/46* | (2006.01) | |

(52) U.S. Cl.
CPC ............... *B63H 21/17* (2013.01); *B63H 1/16* (2013.01); *B63H 21/38* (2013.01); *B63H 25/46* (2013.01)

(58) Field of Classification Search
CPC .......... B63H 21/17; B63H 21/38; B63H 1/16; B63H 25/46
See application file for complete search history.

(56) References Cited

U.S. PATENT DOCUMENTS

| | | | |
|---|---|---|---|
| 5,674,056 | A | 10/1997 | Yamamoto et al. |
| 5,704,306 | A | 1/1998 | Den Ouden |
| 2012/0229005 | A1 | 9/2012 | Tominaga et al. |
| 2018/0134355 | A1 | 5/2018 | Suzuki et al. |

FOREIGN PATENT DOCUMENTS

| | | | | |
|---|---|---|---|---|
| FR | 3091066 A3 | 6/2020 | | |
| WO | WO-2005087584 A1 | * | 9/2005 | ............. B63H 21/17 |

OTHER PUBLICATIONS

European Search Report for Application EP20472012, dated Mar. 31, 2021.

* cited by examiner

*Primary Examiner* — Stephen P Avila
(74) *Attorney, Agent, or Firm* — MARSHALL, GERSTEIN & BORUN LLP

(57) ABSTRACT

A driving unit for an electric tunnel thruster. Such driving unit includes an electric motor, a controller and a support for mounting the electric motor and its controller on a tunnel of the tunnel thruster. The electric motor and the controller have separate housings and are mounted separately from each other to the electric motor support that is also a heat conductive radiator element for cooling the controller, and at least one heat radiating surface of the controller is contacted to at least one heat-absorbing surface of the electric motor support.

10 Claims, 4 Drawing Sheets

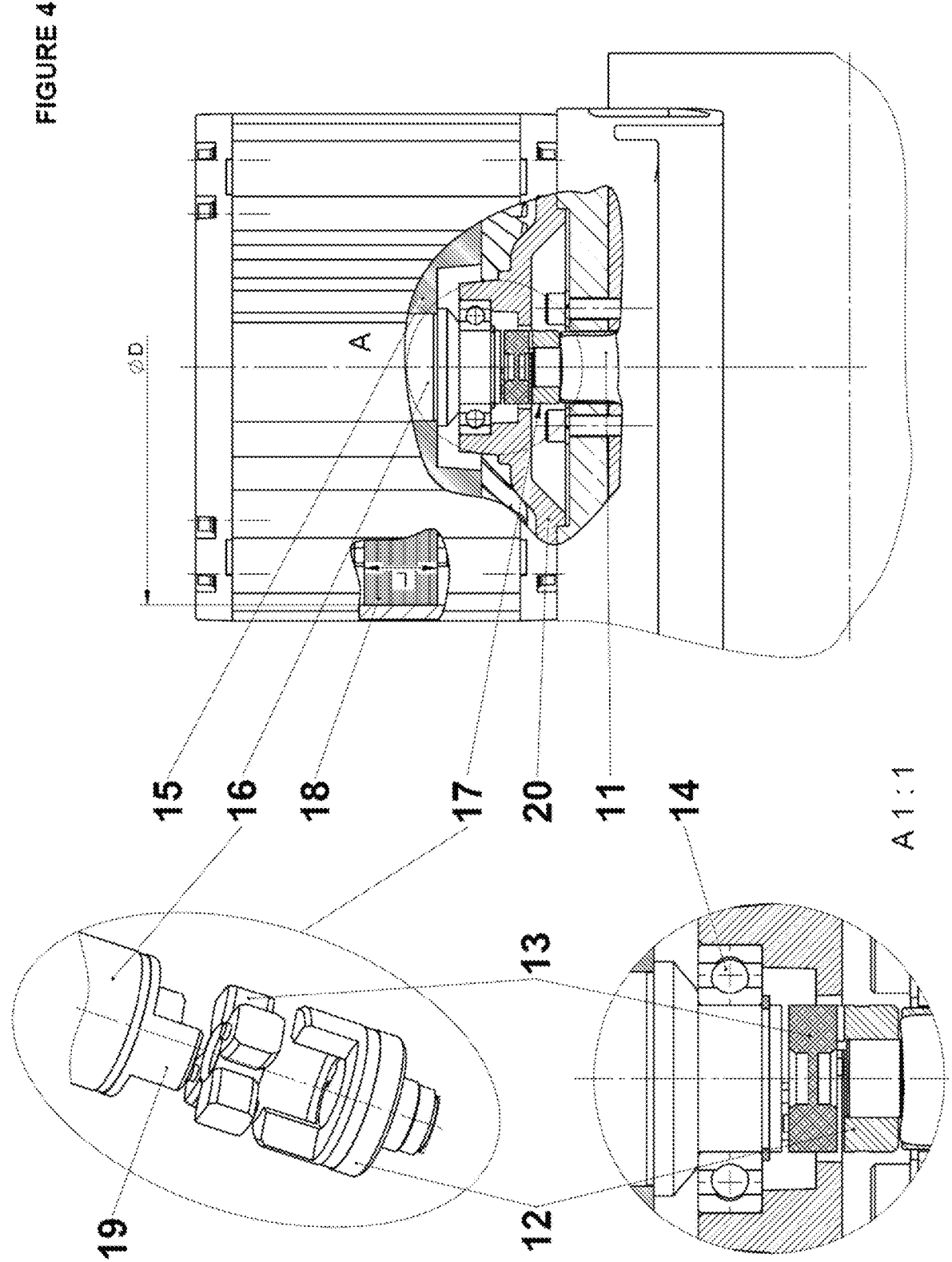

DRIVING UNIT FOR A TUNNEL THRUSTER AND A TUNNEL THRUSTER WITH SUCH DRIVING UNIT

CROSS-REFERENCE TO RELATED APPLICATION

The present application claims priority to European Application No. 20472012.2, filed Sep. 28, 2020. The priority application, EP 20472012.2, is hereby incorporated by reference in its entirety.

TECHNICAL FIELD OF THE INVENTION

The invention is in the field of maneuvering thrusters (bow or stern thruster) for ships or boats. More particularly the invention relates to the driving unit for a tunnel thruster.

PRIOR ART

Bow or stern tunnel thrusters are widely used in water vehicles. These devices are mounted in transverse tunnels in the front or back part of a boat and are used as propulsion devices for maneuvering the boat. Tunnel thrusters usually have a propeller with blades and L-shaped reductor arranged in the tunnel, a driving unit comprising a support for the electric motor arranged on the upper side of the tunnel, an electric motor mounted on the support, a controller or relay for the electric motor and a coupling between the reductor shaft and the electric motor shaft.

The controller of the electric motor is a heat generating device and needs cooling. Cooling of the controller is provided by a radiator element on the controller or by an additional cooling element such as a fan.

Other technical problem of tunnel thrusters is their vertical dimensions—especially thrusters mounted in the front part of a boat are arranged in limited spaces with low ceiling. Vertical dimension of the driving unit of the tunnel thruster is the sum of the height of the electric motor, the height of the motor support and the height of additional devices mounted on the electric motor, such as a controller and/or a fan. Vertical dimensions of the electric motor correspond to the motor length which usually depends on the required motor torque, because the shaft of the thruster motor is vertical. The more torque the motor has, the longer (higher) it is at the same diameter. Vertical dimensions of the motor support correspond to the coupling height that is usually accommodated in the motor support.

Most of the thrusters available on the market use brushed DC motors with their biggest advantage being their ability to work without a controller on an ON/OFF principle. They have disadvantages: usually quite long because of the added length of the commutator and brush assembly, need active internal air cooling via a shaft mounted fan (further adding to length), produce carbon dust from the brushes, need regular brush maintenance and replacement, difficult to make a cavity in the end shields to accommodate a coupling. Some manufacturers offer a standalone (bulkhead) controller (mounting on the motor not very practical as it is a significant source of heat).

A thruster with an AC motor is known, with aluminum radiator that is used to both cool the controller and fix the controller to the motor having 2 small fans bolted to it. Disadvantages of this design are: the controller soaks heat from the motor, fans are separately powered using additional energy, overall height is big.

Another thruster with an AC motor is known, whose controller is mounted on top of the motor together with a separately powered fan, both adding to motor length (height). The fan blows cool air around the controller which is then passed through covered fins on the motor housing. Disadvantages of this design are: controller soaks heat from the motor, fan is separately powered using additional energy, overall height is bigger.

SUMMARY OF THE INVENTION

An object of the invention is to provide a driving unit for a thruster that has a support for electric motor that is also a radiator element for the controller of the electric motor of said driving unit.

Another object of the invention is to provide a driving unit for a thruster that has low vertical dimensions, subject to the motor power requirements. Another related object of the invention is to provide a cooling and mounting element for the electric motor controller that does not increase the height of the driving unit.

Another object of the invention is to provide a thruster with low vertical dimensions for the respective motor torque.

The objects of the invention are solved by providing a driving unit for an electric tunnel thruster that comprises an electric motor, a controller for the electric motor and a support for mounting the electric motor on the tunnel of the electric tunnel thruster. The electric motor and the controller have separate housings. The support is made of metal and is also a radiator element for cooling of the controller, wherein the controller is separately mounted to the electric motor support so that a heat radiating surface of the controller is directly contacted to a heat-absorbing surface of the support.

Advantage of this design is that the electric motor support is also a support for mounting of the motor controller and has an additional function as a radiator element for the controller which eliminates the need for additional cooling elements or devices for the motor controller and makes the driving unit simpler and more effective.

Preferably, the metal body of the electric motor support is a hollow profile that has at least one through cavity between upper supporting wall and lower connecting wall that is open in two opposite ends of the metal body. Through cavities increase the heat dissipation of the electric motor support and improve its effectiveness as a cooling element.

In one variant of the invention the controller is mounted on upper heat-absorbing surface of the support. In other variant the controller is arranged inside one or more of said through cavities of the support.

According to one preferable embodiment, the driving unit for an electric tunnel thruster comprises an AC electric motor, a controller for the AC electric motor and a support for mounting the AC electric motor on the tunnel of the electric tunnel thruster. Also, the AC electric motor has a concave front flange with a bearing seat, whereby a front bearing of the shaft is mounted in an innermost part of the front flange and is arranged fully or partially inside the front end-ring of the motor rotor, creating in this way a cavity for a coupling.

The advantage of this construction is in decreasing overall height of the driving unit that allows installing such driving unit in areas with limited space.

Preferably the stator of the AC electric motor employs hairpin windings.

It is an advantage if a front part of the motor shaft is formed as one of the hubs of a jaw coupling. Such design further decreases the overall height of the driving unit.

The objects of the invention are also solved by providing an electric tunnel thruster comprising a tunnel with a propeller with blades and a reductor arranged in the tunnel, a driving unit comprising a support for an electric motor, arranged on the upper side of the tunnel, an electric motor with a controller mounted on the support and a coupling between the reductor and the electric motor. The driving unit is according to the present invention.

The main advantages of the electric tunnel thruster according to the present invention are the good passive cooling of the controller, the small vertical dimensions and the simpler and easier to manufacture construction.

According to one preferable embodiment of the electric tunnel thruster, the coupling is arranged in the space provided by the concave front flange of the AC electric motor. Preferably the coupling is a jaw coupling and the upper hub of said jaw coupling is integral with the lower part of the electric motor shaft and lower hub of said jaw coupling is mounted on the upper part of a shaft of the reductor. This design allows further decreasing the overall height of the driving unit.

BRIEF DESCRIPTION OF THE DRAWINGS

The invention is explained in more detail by preferred embodiments, given as non-limiting the scope of the invention examples, with reference to the accompanying drawings, in which:

FIG. 4 is a partial vertical section of the electric motor of the driving unit from FIG. 2, showing the design of the front flange and the front part of the motor shaft and an exploded view of the jaw coupling.

EXEMPLARY EMBODIMENT AND APPLICATION OF THE INVENTION

Figure 1:
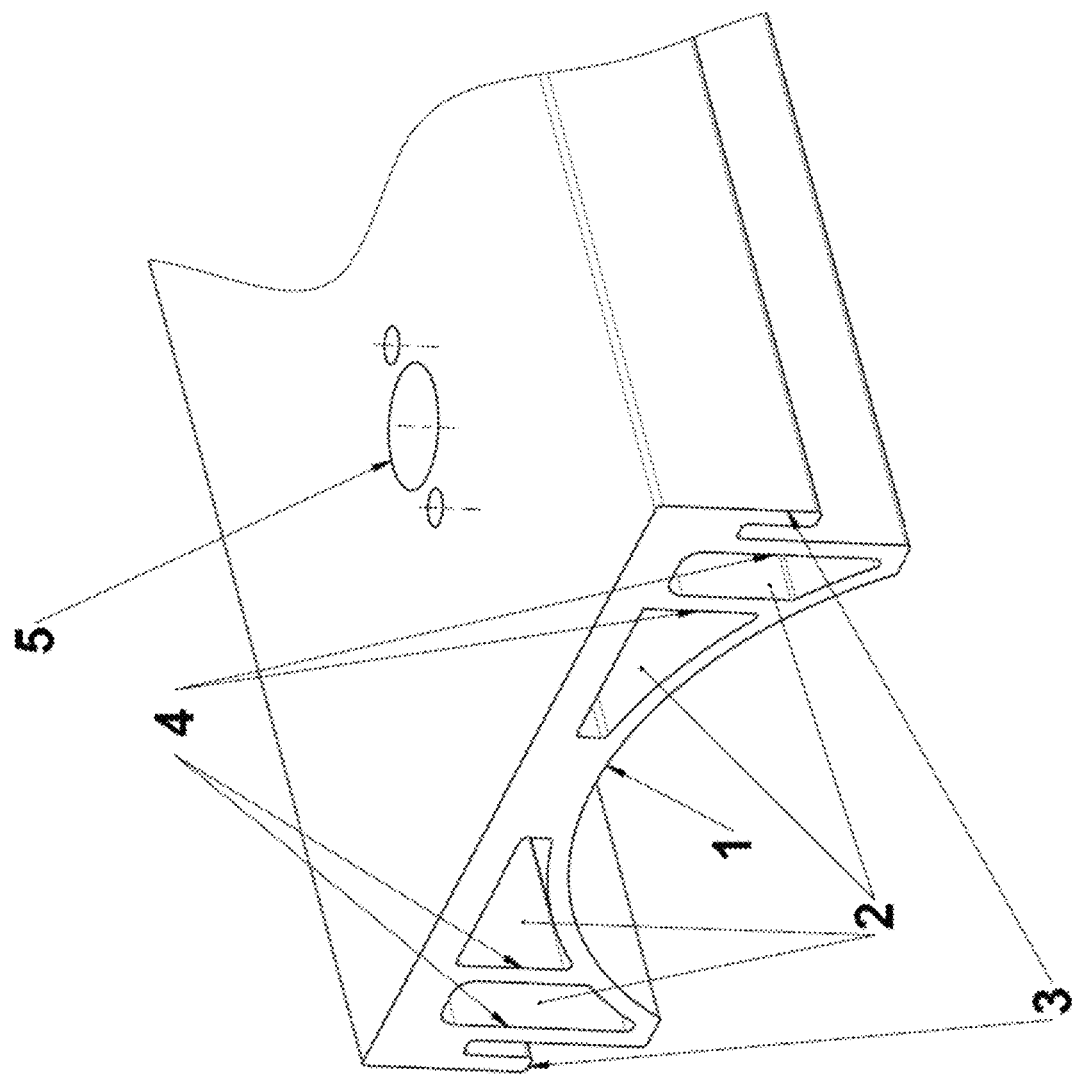
FIG. 1 is a perspective view of a particular variant of the support for electric motor according to the present invention.

In this description the words "upper" and "lower" are not limiting for the respective features and reflect the location of these features in normal operating position of the driving unit for an electric tunnel thruster, as shown on the figures.

According to the present invention the electric motor support 6 is both a support and a radiator element for cooling of the electric motor controller. The electric motor support is a metal body 1 with an upper supporting wall for the electric motor and a lower connecting wall which is concave, having the form of a cylindrical arch, adapted for mounting the support on the tunnel of a thruster. The electric motor support has a vertical through hole 5 for the shaft of the electric motor or for the coupling to the reductor of the thruster. The electric motor 8 and the controller 7 have separate housings and are separately mounted to the electric motor support 6 that has separate to each other mounting areas with heat-absorbing surfaces for contact with heat radiating surface of the electric motor or its controller. In the exemplary embodiment shown on the figures, the upper supporting wall of the support has a heat-absorbing surface and separate mounting areas for the electric motor and the controller. The separate mounting of the controller on the electric motor support provides the possibility for cooling the latter without additional devices such as fans or additional structures such as rib radiator elements. The advantage of this design is that the controller is naturally cooled by the massive electric motor support that is mounted on a tunnel of a thruster which tunnel is always filled with water that forms a continuous cooling flow during operation of the device.

It is advantageous if the metal body 1 of the electric motor support is a hollow profile that has at least one through cavity 3 between upper supporting wall and lower connecting wall that is open in two opposite ends of the metal body 1. The through cavity in the metal body significantly improves the heat dissipation. It is possible to have two or more through cavities 2 as shown on FIG. 1. Said cavities 2 can be separated by vertical reinforcing elements 4. For example, several through cavities 2 can be arranged symmetrically on both sides of a central vertical reinforcing beam. Some of these cavities can be used to house other components of the thruster such as chargers The metal body 1 of the electric motor support may have additional radiator elements such as fins 3 like those shown on FIG. 1.

Preferably the upper supporting wall of the electric motor support is flat and has coupling elements for the electric motor and for the controller in the form of connecting/centering openings and threads. Also, the upper supporting wall may have separate recesses as nests for the controller and for the electric motor.

Alternatively, the mounting area for the controller's subcomponents is arranged in one or more of the through cavities 2 of the electric motor support.

The driving unit for an electric tunnel thruster according to one preferred embodiment of the invention (FIG. 2) comprises an AC electric motor 8, a controller 7 for the AC electric motor and a support 6 for mounting the AC electric motor 8 on a tunnel 9 of the electric tunnel thruster. The axial length L of the stator electrical steel stack 18 of the AC electric motor is less than 60% its diameter D. These dimensions of the motor mean that the motor is relatively short axially, which helps in reducing the height of the driving unit. Another feature of the driving unit is that the electric motor 8 has a concave front flange 20 with a bearing seat in the innermost part of the formed recess in the front flange 20. The front bearing 14 of the motor shaft 16, mounted in said bearing seat of the concave front flange 20, is thus arranged fully or partially inside the front end-ring 15 of the rotor, creating in this way a cavity for the coupling 17 of the AC electric motor 8 with other parts of the tunnel thruster. This arrangement allows further reducing the height of the driving unit as by providing recessed space for the coupling within the dimensions of the AC electric motor, it is possible to reduce the height of the supporting element 6. In the prior art solutions, the supporting element, besides being a support for the motor, also accommodates the coupling and has to be high enough for this. As the coupling 17 can be accommodated in the concave front flange 20 of the electric motor 8 of the present driving unit, the support 6 does not need to be high. Therefore, both the vertical dimensions of the electric motor 8 and the concave form of its front flange 20 contribute for achieving the object of the invention to provide a driving unit for a tunnel thruster that has low vertical dimensions for the respective motor torque.

In general, motor torque for a given motor technology is determined mostly by its volume. In the present invention, the specific shape of the motor is characterized by its bigger diameter that allows reducing its length while retaining the same motor torque.

Figure 2:
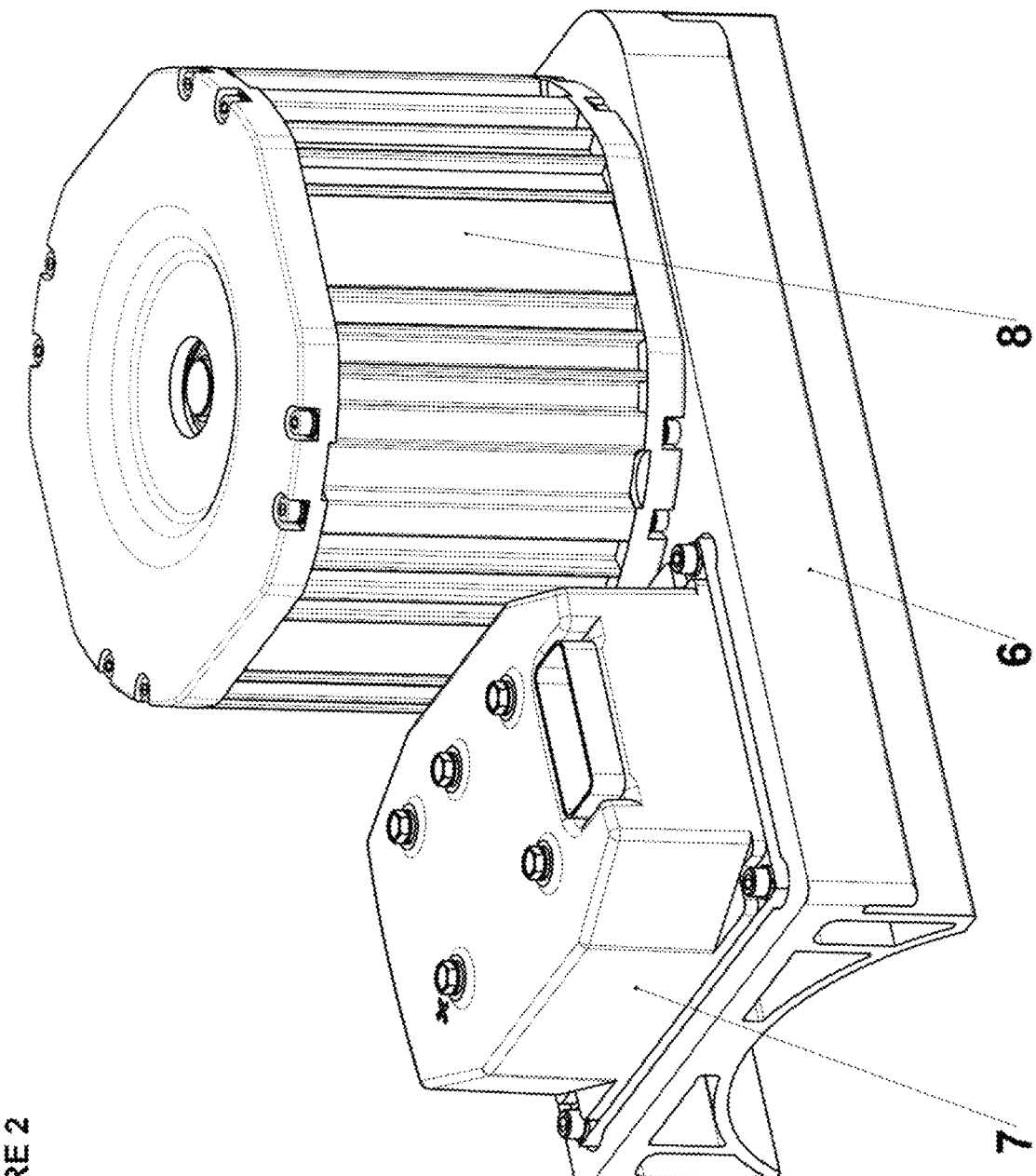
FIG. 2 is a perspective view of a particular variant of the driving unit for a thruster according to the present invention with the electric motor support from FIG. 1 on which the motor controller is separately mounted.
Figure 3:
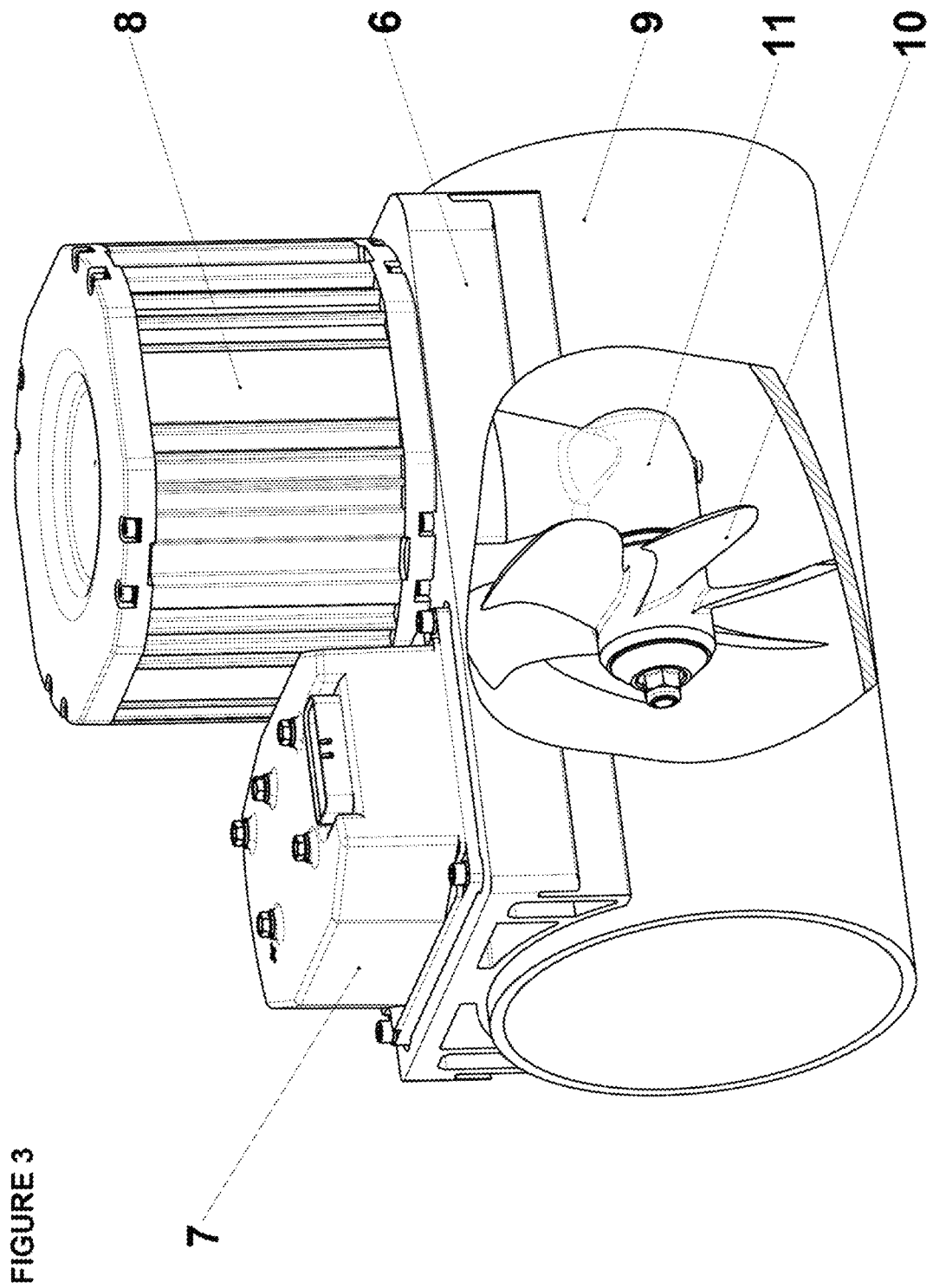
FIG. 3 is a perspective view of a particular variant of a tunnel thruster according to the present invention with the driving unit from FIG. 2 and with a partial section showing the propeller with blades and the reductor arranged in the tunnel.

In the preferred embodiment of the invention, shown in FIGS. 2, 3 and 4, the AC electric motor has a hairpin stator. A hairpin stator uses massive rectangular conductors rather than many strands of small wire arranged in parallel. Therefore, it offers much higher slot fill factors allowing more copper to be fitted in a given volume. The result is a smaller motor with better efficiency. Thus, the hairpin stator allows shortening the length of the electric motor while keeping its power/torque characteristics.

In the preferred embodiment of the invention, shown in FIG. 4, the rotor has a relatively big diameter. This allows using a rotor shaft 16 with a relatively big diameter too. Big diameter of the rotor shaft 16 allows forming of one (the lower) end of the rotor shaft as a part of the coupling 17. Particularly suitable coupling for the tunnel thrusters is the flexible jaw coupling 17 that is used to damp vibrations and to accommodate misalignment. Usually, the jaw coupling consists of two metallic hubs with jaws and one elastomer insert 13, called "spider", that is arranged between alternating teeth of the hubs. According to this embodiment, one of the coupling jaw hubs 19 is formed directly on the lower end of the rotor shaft 16 as an integral part of it. This shortens the length of the coupling 17, allows using a short support 6 and contributes to achieving the object of the invention to provide a short/low driving unit.

In the preferred embodiment of the invention shown in the figures, an electric motor support 6, according to the invention, is used. As explained above, this support 6 is a radiator element both for the electric motor 8 and for the controller 7 and is long enough to accommodate both devices. The controller 7 is separately mounted on the upper supporting wall of the support 6 so that a heat radiating surface of the controller 7 is directly contacted to a heat-absorbing upper surface of the support 6. In the variant shown in the figures, an AC electric motor 8 is used but this arrangement is suitable for different types of electric motors and controllers. For example, the electric motor could be a DC electric motor or another.

In a variant of the above embodiment not shown on the figures, the controller 7 is mounted inside one or more of said through cavities 2 of the electric motor support 6. In this variant the electronic subcomponents (such as chips, MOSFET and/or IGBT modules, printed circuit boards, capacitors, sensors, etc) of the controller are directly installed inside said through cavities using the electric motor support both as an outer housing of the controller and a heat absorbing radiator for heat generated by the electronic subcomponents of the controller. In this embodiment the printed circuit boards with the electronic subcomponents of the controller are sized to fit the through cavities 2 of the support 6. The printed circuit boards of the controller are mounted to the internal walls of the through cavities 2 by known fastening elements so that the heat generating subcomponents of the controller (such as MOSFET) contact the walls of the through cavities 2 and can transfer the generated heat to the support 6. The subcomponents of the controller can be arranged in two or more through cavities 2 of the support 6 depending on the dimension of the printed circuit boards of the controller and on the dimensions of the through cavities 2. In such variant through openings are provided in the walls of the support 6 between different through cavities 2 for the conductors connecting different components of the controller. Also, through openings are provided in the walls of the support 6, for example in the upper wall, for the connecting wires between the electric motor and the controller.

Also, as shown in the figures, the electric motor support is very low/short which is possible due to the above-described design of the electric motor within whose dimensions the coupling 17 is accommodated, so there is no need for a high support to house the coupling.

The electric tunnel thruster according to the invention (FIG. 3) comprises:
a tunnel 9 with a propeller 10 with blades and
a reductor 11 arranged in the tunnel 9,
a driving unit according to the invention as described above comprising:
an electric motor support 6 arranged on the upper side of the tunnel 9,
an electric motor 8 with a controller 7 mounted on the electric motor support 6 and
a coupling 17 between the reductor 11 and the electric motor 8.

This design provides for an electric tunnel thruster with low overall vertical dimensions. This effect is due to the cumulative characteristics of the driving unit:
the relatively short/low electric motor 8 and
the coupling 17 that is completely or partially arranged within the dimensions of the electric motor 8, mostly in the recess formed in the concave front flange 20 of the electric motor 8.

The particular embodiment shown on FIG. 4 has further characteristics that allow additionally shortening the vertical dimensions of the driving unit.

Forming the lower part of the rotor shaft 16 as one of the jaw hubs 19 of the jaw coupling 17 between the electric motor 8 and the reductor 11 of the propeller 10 shortens the coupling assembly and allows using a very low motor support 6.

Using the motor support 6 both as support and radiator element for the controller 7 of the electric motor eliminates the need for additional cooling elements for the controller 7.

The thruster/thruster drive unit can be controlled with a proportional joystick (remote control being an option), connected to the controller.

The thruster/thruster drive unit is usually powered by a dedicated battery which is charged from the on-board electrical system/generator. Other, known from the prior art, power supply methods are possible.

If the electric motor support 6 has through cavities 2, some of these cavities can be used to house other components of the thruster such as a charger for the dedicated battery or the controller 7.

A particular example of an electric tunnel thruster according to the present invention is one with 100 kgf thrust which requires a tunnel with 185 mm internal diameter, and a matching propeller, spun at 2700 rpm by the L-shaped reductor. The driving unit of this thruster comprises an electric motor support with the following exemplary dimensions—width (measured transverse to the central axis of the tunnel)—212 mm, length—(measured parallel to the central axis of the tunnel)—365 mm and height (measured from the apex of the tunnel)—30 mm. The width of the electric motor support is commensurate to the outer diameter of the tunnel. The driving unit also comprises a 5.5-6.0 kW/4000 rpm/24V AC motor with hairpin stator, designed according to the present invention. The dimensions of the stator core are D—200 mm and L—35 mm, therefore the axial length L of the stator is 17.5% of its diameter D. As a result, the outer dimensions of the AC motor are 212 mm diameter and 153 mm length. Thus, the total height of the driving unit measured from the apex of the tunnel is 173 mm, which is low enough to use this driving unit in almost any boat.

In another example with the same dimensions of the tunnel and the electric motor support, an electric motor with higher torque is possible (for example 8 kW/2500 rpm/24V). This motor retains the same stator diameter D (200 mm), the axial length L of the stator is 95 mm which is 47.5% of the stator diameter D. The outer length of the electric motor is 213 mm and the total height of the driving unit measured from the apex of the tunnel is 233 mm.

Reference numbers of the technical features are included in the claims for the sole purpose of increasing the intelligibility of the claims and accordingly those reference numbers have no limiting effect on the interpretation of the elements, indicated by these reference numbers.

What is claimed is:

1. A driving unit for an electric tunnel thruster comprising an electric motor, a controller for the electric motor and an electric motor support comprising a metal body with an upper wall, supporting the electric motor, and a concave lower wall with the form of a cylindrical arch for mounting on a tunnel of the electric tunnel thruster, characterized in that the electric motor and the controller have separate housings and are mounted separately from each other to the electric motor support that is a heat conductive radiator element for cooling the controller, and at least one heat radiating surface of the controller is contacted to at least one heat-absorbing surface of the electric motor support.

2. The driving unit according to claim 1, the metal body of the electric motor support having a hollow profile that has at least one through cavity between said upper wall and said lower wall that is open in two opposite ends of the metal body.

3. The driving unit according to claim 1, the controller being mounted on upper heat-absorbing surface of the upper wall of the electric motor support that is flat and has separate to each other mounting areas for the electric motor and for the controller.

4. The driving unit according to claim 2, the controller being mounted inside at least one of said through cavities of the electric motor support.

5. The driving unit according to claim 1, further comprising an AC electric motor, wherein the axial length L of a stator electrical steel stack of the AC electric motor is less than 60% its diameter D, wherein the electric motor has a concave front flange with a bearing socket, a front bearing of a motor shaft being mounted in an innermost part of the front flange and arranged one of fully or partially inside the front end-ring of a motor rotor, creating a cavity for a coupling.

6. The driving unit according to claim 5 the stator of the AC electric motor including hairpin windings.

7. The driving unit according to claim 5, a front part of a motor shaft being formed as one hub of a flexible jaw coupling.

8. An electric tunnel thruster comprising a tunnel with a propeller with blades and a reductor arranged in the tunnel, a driving unit comprising an electric motor support arranged on the upper side of the tunnel, an electric motor with a controller mounted on the electric motor support and a coupling between the reductor and the electric motor in combination with a driving unit for an electric tunnel thruster comprising an electric motor, a controller for the electric motor and an electric motor support comprising a metal body with an upper wall, supporting the electric motor, and a concave lower wall with the form of a cylindrical arch for mounting on a tunnel of the electric tunnel thruster, characterized in that the electric motor and the controller have separate housings and are mounted separately from each other to the electric motor support that is a heat conductive radiator element for cooling the controller, and at least one heat radiating surface of the controller being contacted to at least one heat-absorbing surface of the electric motor support.

9. The electric tunnel thruster according to claim 8, the driving unit further comprising an AC electric motor, wherein the axial length L of a stator electrical steel stack of the AC electric motor is less than 60% its diameter D, wherein the electric motor has a concave front flange with a bearing socket, a front bearing of a motor shaft being mounted in an innermost part of the front flange and arranged one of fully or partially inside the front end-ring of a motor rotor, creating a cavity for a coupling, wherein the coupling is arranged in the space provided by the concave front flange of the electric motor.

10. The electric tunnel thruster according to claim 9 the driving unit including a front part of a motor shaft formed as one hub of a flexible jaw coupling, an upper hub of which is integral with the lower part of the electric motor shaft and a lower hub of which is mounted on the upper part of a shaft of the reductor.

* * * * *

UNITED STATES PATENT AND TRADEMARK OFFICE
CERTIFICATE OF CORRECTION

PATENT NO. : 11,760,459 B2
APPLICATION NO. : 17/485018
DATED : September 19, 2023
INVENTOR(S) : Plamen Iordanov Nakev It is certified that error appears in the above-identified patent and that said Letters Patent is hereby corrected as shown below:

On the Title Page

At Item (71), Line 1, "Plamen Iordanov Nakev, Sofia (BG)" should be -- Balkancar ZPDEA G. Kostov AD, Sofia (BG) --.

Below Item (72), insert -- (73) Assignee: Balkancar ZPDEA G. Kostov AD, Sofia (BG) --.

Signed and Sealed this
Ninth Day of April, 2024

*Katherine Kelly Vidal*

Katherine Kelly Vidal
*Director of the United States Patent and Trademark Office*